US 8,572,746 B2

(12) United States Patent
Markopoulou et al.

(10) Patent No.: US 8,572,746 B2
(45) Date of Patent: Oct. 29, 2013

(54) PREDICTIVE BLACKLISTING USING IMPLICIT RECOMMENDATION

(75) Inventors: Athina Markopoulou, Irvine, CA (US); Fabio Soldo, Irvine, CA (US); Anh Le, Irvine, CA (US)

(73) Assignee: The Regents of The University of California, Oakland, CA (US)

( * ) Notice: Subject to any disclaimer, the term of this patent is extended or adjusted under 35 U.S.C. 154(b) by 821 days.

(21) Appl. No.: 12/691,631

(22) Filed: Jan. 21, 2010

(65) Prior Publication Data

US 2011/0179492 A1   Jul. 21, 2011

(51) Int. Cl.
*H04L 29/06* (2006.01)
(52) U.S. Cl.
USPC ............................................................. 726/25
(58) Field of Classification Search
None
See application file for complete search history.

(56) References Cited

U.S. PATENT DOCUMENTS

| | | | | |
|---|---|---|---|---|
| 7,738,377 | B1 * | 6/2010 | Agostino et al. | 370/233 |
| 7,757,285 | B2 * | 7/2010 | Kubota | 726/23 |
| 2003/0236995 | A1 * | 12/2003 | Fretwell, Jr. | 713/200 |
| 2005/0039086 | A1 * | 2/2005 | Krishnamurthy et al. | 714/57 |
| 2008/0115221 | A1 * | 5/2008 | Yun et al. | 726/25 |
| 2009/0086755 | A1 * | 4/2009 | Chen et al. | 370/468 |
| 2009/0106174 | A1 * | 4/2009 | Battisha et al. | 706/12 |
| 2009/0106839 | A1 * | 4/2009 | Cha et al. | 726/23 |
| 2009/0245176 | A1 * | 10/2009 | Balasubramanian et al. | 370/328 |
| 2010/0095374 | A1 * | 4/2010 | Gillum et al. | 726/22 |
| 2010/0122335 | A1 * | 5/2010 | Van der Merwe et al. | 726/11 |
| 2010/0138919 | A1 * | 6/2010 | Peng et al. | 726/22 |
| 2010/0161537 | A1 * | 6/2010 | Liu et al. | 706/46 |
| 2010/0299287 | A1 * | 11/2010 | Cao et al. | 706/12 |
| 2011/0067086 | A1 * | 3/2011 | Nachenberg et al. | 726/2 |
| 2012/0096558 | A1 * | 4/2012 | Evrard | 726/25 |

OTHER PUBLICATIONS

Zesheng Chen; Chuanyi Ji; Barford, P.; , "Spatial-Temporal Characteristics of Internet Malicious Sources," INFOCOM 2008. The 27th Conference on Computer Communications. IEEE , vol., No., pp. 2306-2314, Apr. 13-18, 2008 doi: 10.1109/INFOCOM.2008.299 URL: http://ieeexplore.ieee.org/stamp/stamp.jsp?tp=&arnumber=4509894&isnumber=4509595.*

J. Zhang, P. Porras, and J. Ullrich, "Highly predictive blacklisting," in Proc. of USENIX Security '08 (Best Paper award), San Jose, CA, USA, Jul. 2008, pp. 1-16.

* cited by examiner

*Primary Examiner* — Jeffery Williams
(74) *Attorney, Agent, or Firm* — Shimokaji & Assoc., PC

(57) ABSTRACT

A method is provided for determining a rating of a likelihood of a victim system receiving malicious traffic from an attacker system at a point in time. The method comprises: generating a first forecast from a time series model based on past history of attacks by the attacker system; generating a second forecast from a victim neighborhood model based on similarity between the victim system and peer victim systems; generating a third forecast from a joint attacker-victim neighborhood model based on correlation between a group of attacker systems including the attacker system and a group of victim systems including the victim system; and determining the rating of the likelihood of the victim system receiving malicious traffic from the attacker system at the point in time based on the first forecast, the second forecast, and the third forecast.

19 Claims, 9 Drawing Sheets

PREDICTIVE BLACKLISTING USING IMPLICIT RECOMMENDATION

GOVERNMENT RIGHTS

This invention was made with government support under grant 0831530 awarded by the National Science Foundation. The government has certain rights in the invention

FIELD OF THE INVENTION

The present invention generally relates to computer security, and more particularly relates to predictive blacklisting of malicious attack sources using implicit recommendation.

BACKGROUND OF THE INVENTION

Computer network security has become increasingly important over time as sensitive and confidential information are increasingly being transmitted across these computer networks. To that end, computers often provided secure environments to store such sensitive and confidential information by employing mechanisms that offer protection to the stored information. Unfortunately, with the increasing ubiquitous use of the Internet, the effectiveness of these security mechanisms are being compromised through a series of continuous malicious attacks directed toward gaining access to the sensitive and confidential information stored within secure environments provided by computers.

Blacklisting is a widely used defense practice against malicious traffic on the Internet. Blacklisting encompasses the compiling and sharing of lists of prolific attacking systems in order to predict and block future attacks. The existing blacklisting techniques have focused on the most prolific attacking systems and, more recently, on collaborative blacklisting.

More formally, given a blacklist of length N, a metric of a blacklist's predictiveness may be a hit count defined as the number of attackers in the blacklist that are correctly predicted (i.e., malicious activity from these sources appears in the logs in the next time slot). A blacklist with a higher hit count may be considered more "predictive" compared to a blacklist with a lower hit count.

Two upper bounds of prediction may be defined: a global upper bound and a local upper bound. For every victim v, the global upper bound on the hit count of v may be defined as the number of attackers that are both in the training window of any victim and in the testing window of v. Thus, the global upper bound may correspond to the case where the past logs of all victims are available to make a prediction, or when each victim shares information with all other victims. Further, for every victim v, the local upper bound on the hit count of v may be the number of attackers that are both in the training window and in the testing window of v. Thus, the local upper bound represents the upper bound on the hit count when each victim v only has access to its local security logs but does not have access to the logs of other victims. Because the local upper bound may be based upon less information than the global upper bound, it may have a lower total hit count than the global upper bound. Generally, the more predictive a blacklist is, the closer its hit count will be to the upper bounds.

Two blacklisting techniques are the Global Worst Offender List (GWOL) and the Local Worst Offender List (LWOL). GWOLs refer to blacklists that include top attack sources that generate the highest numbers of attacks globally, as reported at universally reputable repositories, while LWOLs refer to blacklists of the most prolific attack sources as logged by security devices deployed on a specific site. There are benefits associated with either list but relying entirely on them alone has many drawbacks. For example, while GWOLs include top attack sources that generate the highest number of attacks globally, it may include lists that may be irrelevant to particular victim networks. By contrast, relying on LWOLs may fail to predict attack sources that may not have previously attacked that specific site but are troubling attack sources globally. In addition, LWOL is essentially reactive but can be implemented by the operator of any network independently.

In another blacklisting technique called highly predictive blacklisting (HPB), the attention is shifted from attacker profiles to victim profiles. In other words, the future attacks are predicted based not only on a victim's own logs but also on logs of a few other "similar" victims. Similarity between two victims can be defined as the number of their common attackers, based on empirical observations made earlier. In this manner, predictive blacklisting can be posed as a link-analysis problem, with the focus being on relevance propagation on the victim-victim graph. However, this approach does not rely on the attacker profile as before and therefore is not all-inclusive.

As can be seen, while the aforementioned approaches for predicting malicious attacks may be able to capture some of the attack patterns of malicious devices, they still leave much room for improvement. Consequently, what is needed are improved systems and methods for blacklisting that can accurately and compactly predict future attacks while minimizing the number of false positives.

SUMMARY OF THE INVENTION

In one aspect of the present invention, a method for determining a rating of a likelihood of a victim system receiving malicious traffic from an attacker system at a point in time comprises: generating a first forecast from a time series model based on past history of attacks by the attacker system; generating a second forecast from a victim neighborhood model based on similarity between the victim system and peer victim systems; generating a third forecast from a joint attacker-victim neighborhood model based on correlation between a group of attacker systems including the attacker system and a group of victim systems including the victim system; and determining the rating of the likelihood of the victim system receiving malicious traffic from the attacker system at the point in time based on the first forecast, the second forecast, and the third forecast.

In another aspect of the present invention, a system comprises: a processor; and a computer program that executes on the processor to: generate a first forecast from a victim neighborhood model based on similarity between a victim system and peer victim systems; associate a first weight with the first forecast that correlates with the similarity between the victim system and peer victim systems; generate a second forecast from a joint attacker-victim neighborhood model based on correlation between a group of attacker systems including the attacker system and a group of victim systems including the victim system; associate a second weight with the second forecast that correlates with a density of the group of attacker systems including the attacker system and the group of victim systems including the victim system; and determine a rating of a likelihood of the victim system receiving malicious traffic from the attacker system at a point in time based on the first forecast weighed with the first weight and the second forecast weighed with the second weight.

In another aspect of the present invention, a computer readable storage medium having instructions stored thereon that when executed by a processor cause a system to: generate a first forecast from an Exponential Weighted Moving Average model that determines a likelihood of future attacks by an attacking system on a victim system based on past likelihoods of attacks of the victim system by the attacking system that are weighed with exponentially decreasing weights towards older values; generate a second forecast from a neighborhood model based on correlation between the victim system, attacker systems, and peer victim systems; and determine a rating of a likelihood of the victim system receiving malicious traffic from the attacker system at a point in time based on the first forecast and the second forecast.

These and other features, aspects and advantages of the present invention will become better understood with reference to the following drawings, description and claims.

BRIEF DESCRIPTION OF THE DRAWINGS

FIGS. 2a and 2b show an recommendation system rating matrix and an attack prediction matrix according to an embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide predictive blacklisting against malicious traffic using recommendation by determining a rating of a likelihood of a victim receiving a malicious attack from attacker systems based on a combination of forecasts including a forecast based on a time series model, a forecast based on a victim neighborhood model, and a forecast based on a joint attacker-victim neighborhood model.

Figure 1:
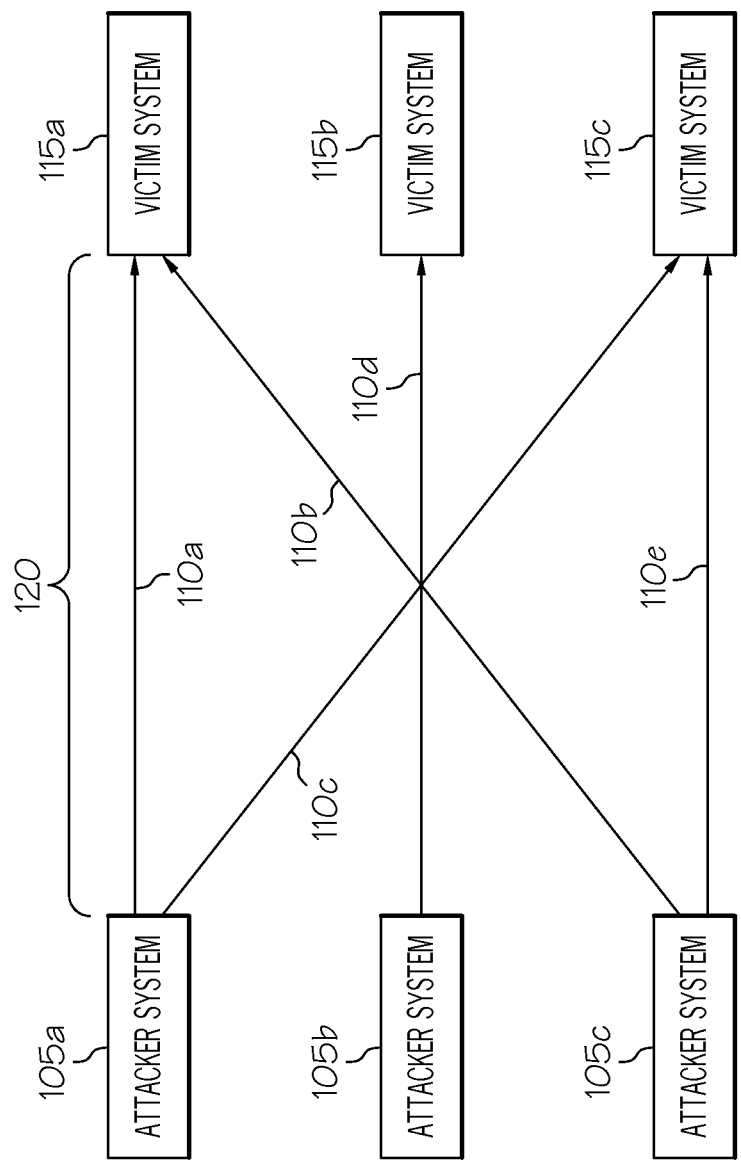
FIG. 1 shows an overview of interactions between attacking systems and victim systems in accordance with an embodiment of the present invention.

FIG. 1 shows an overview of interactions between attacking systems and victim systems in accordance with an embodiment of the present invention. As shown in FIG. 1, attacking systems 105a, 105b, and 105c may attack victim systems 115a, 115b, and 115c by sending malicious data 110a, 110b, 110c, 110d, and 110e over a network 120 to the victim systems 115a, 115b, and 115c. A single attacking system 105a may send malicious data 110a and 110c over the network 120 to multiple victim systems 115a and 115c. Thus, victim systems 115a 115c may share a common attack system 105a. A single victim system 115c may also receive malicious data 110c and 110e over the network 120 from multiple attacker systems 105a and 105c.

Figures 2A, 2B:
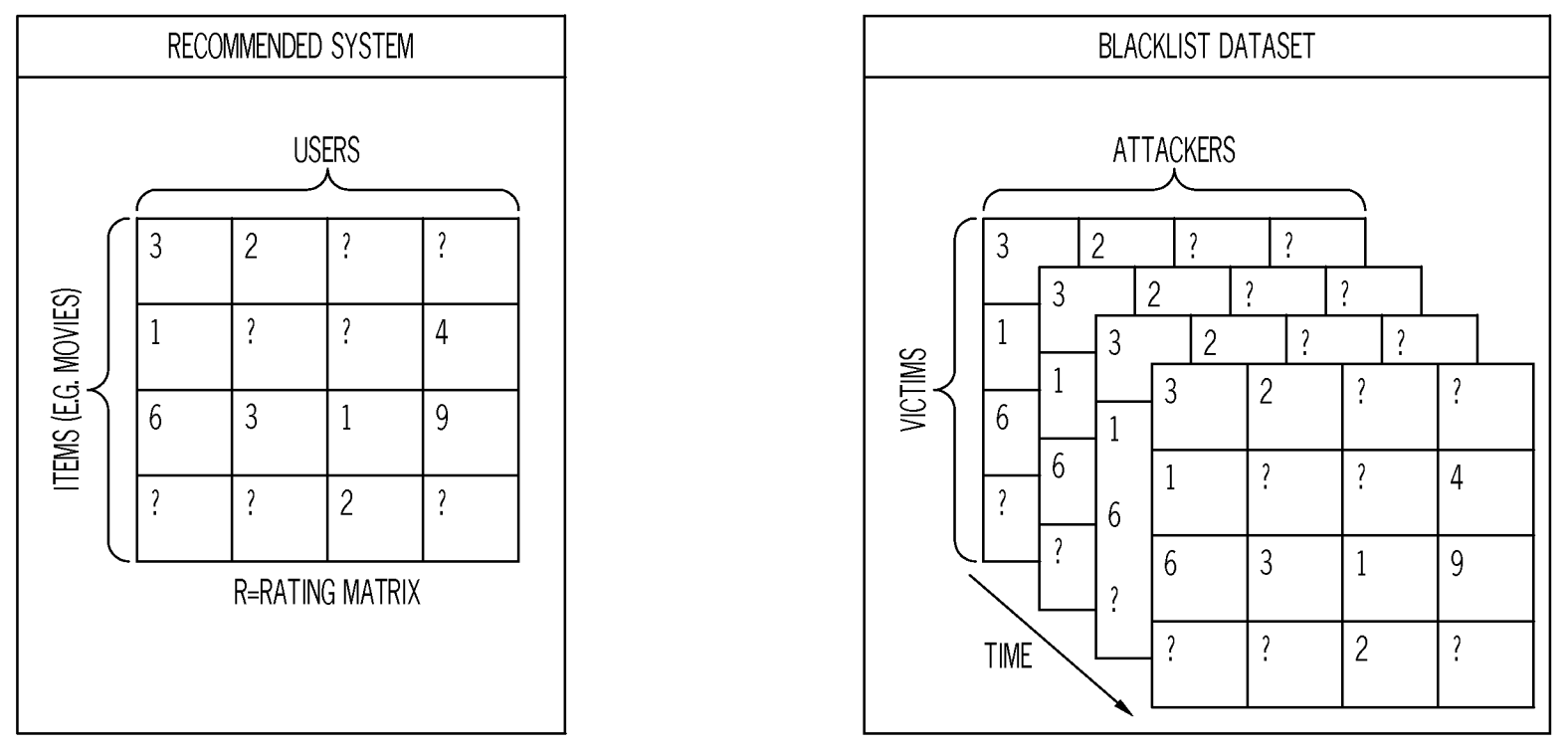

In accordance with an embodiment of the present invention, system and methods for predicting malicious attacks may correspond to an implicit recommendation system. FIG. 2a shows a rating matrix for an implicit recommendation system in accordance with an embodiment of the present invention. An implicit recommendation system may operate to infer unknown user ratings about items based upon known past ratings, based on a user-specific ratings model. As shown in FIG. 2a, the rating matrix may set a rating for each item-user pair that indicates the likelihood that the particular user will enjoy using that particular item. The ratings may be a result of several superimposed processes, such as previous ratings a specific user has given for similar items indicating how much the user likes those items.

Ultimately, the goal of a recommendation system may be to find, for every user u, the item $i_u$ that may have the highest rating. Given a set of users (customers) V and set of items A, a user may be allowed to rate items to indicate how much that user likes certain items with R={1, 2, . . . N} as the set of possible ratings that may make up the entire |V|-by-|A| (user-by-items) rating matrix, where N may typically be a small integer. However, because a user generally may not rate all available items, there may only be a small subset of items for which the user's rating is known. Thus, $K_u$ may represent the set of items for which the rating $r_{ui}$ assigned by user u to item i may be known, with a complement $\overline{K}_u$. The recommendation system may then be formalized to find $$i_u = \arg\max_{i' \in K_u} r_{ui'}, \forall u \in V,$$

where a recommended item $i_u$ for user u may maximize the equation. The solution of the equation may usually be obtained by first estimating the matrix R on the subset $\overline{K}_u$, and then, for every user, selecting the item for which the estimated rating is the highest. In general, in order to recommend N≥1 items, the top-N items for which the estimated ratings are the highest may be selected.

In accordance with an embodiment of the present invention, future attacks by an attacking system on a victim system may be predicted based on previously observed activities. FIG. 2b shows an attack prediction matrix in accordance with an embodiment of the present invention. As shown in FIG. 2b, because the intensity of an attack may vary over time, the attack prediction matrix may be a 3-dimensional matrix of attack systems and victim systems over time where a rating or preference indicating attack intensity by an attacking system towards a victim system at a point in time may be associated for every (attacking system, victim system, point of time) triplet within the attack prediction matrix.

However, unlike the recommendation system ratings matrix shown in FIG. 2a for which the ratings may be a result of previous ratings explicitly provided by a user, the rating or preference in an attack prediction matrix may be implicit, in that it may be inferred by activity reported in logs instead of explicitly provided.

In accordance with an embodiment of the present invention, an attack prediction problem may be formalized as follows: V may denote the set of victim networks, A may denote the set of attacker systems (i.e., source IP prefixes from where attacks may be launched), and t may indicate the day an attack was performed according to its log, while T may denote the time window under consideration, so that t=1, 2, ... T. Time window T may further be divided into two consecutive windows: a training window $T_{train}$ and a testing window $T_{test}$ such that training data used to tune the prediction algorithm may be separated from testing data used to validate the predictions.

As discussed above, the attack matrix may be a 3-dimensional rating matrix R where for every tuple (a, v, t), the number of attacks reported on day t from a∈A to v∈V may be represented by $r_{a,v}(t)$. Further, a binary matrix B may indicate whether or not an attack occurred: $b_{a,v}(t)=1$ if and only if $r_{a,v}(t)>0$, otherwise $b_{a,v}(t)=0$. Finally, the set of attackers that were reported by victim system v during time period T may be represented as $A_v(T)=\{a\in A: \exists t\in Ts\cdot b_{a,v}(t)=1\}$ while the total set of attack sources reported during time period T may be represented as $A(T)=\cup_{v\in V}A_v(T)$.

In order to determine for every victim system v the attackers that may be more likely to attack v in the future based upon past observations of malicious activity, a blacklist BL of sources that may be likely to attack in the future may be provided. Given a fixed blacklist size N, $\hat{BL}$ may represent any set of N different attackers. Thus, the problem of attack prediction may be formalized as finding $$BL(v) = \underset{\hat{BL} \subset A}{\operatorname{argmax}} \sum_{t \in Test} \sum_{a \in \hat{BL}} b_{a,v}(t),$$

where the output of the problem may be a set of blacklists $BL(v)=\{a_1^v, a_2^v, \ldots, a_N^v\} \subset A$ customized for every victim system v, such that each blacklist BL(v) may contain the top N attackers that may be more likely to attack victim system v in a testing window.

However, for every day t in the testing window, an entire |A|-by-|V| matrix may need to be estimated before the max operation in the formalized attack prediction problem may be performed. Thus, the attack prediction problem may be a generalization of the recommendation system problem where the set of possible ratings R may now be defined on a 3-dimensional space V×A×T as opposed to a 2-dimensional space.

For every blacklist BL and testing period $T_{test}$, the total number of false positive FP may be defined as $$FP_{BL}(T_{test}) = \sum_{t \in Test} \left( N - \sum_{a \in BL} b_{a,v}(t) \right).$$

Thus, for fixed blacklist length N, solving for BL(v) may also be equivalent to finding the blacklist that minimizes the number of false positives.

Figure 3A:
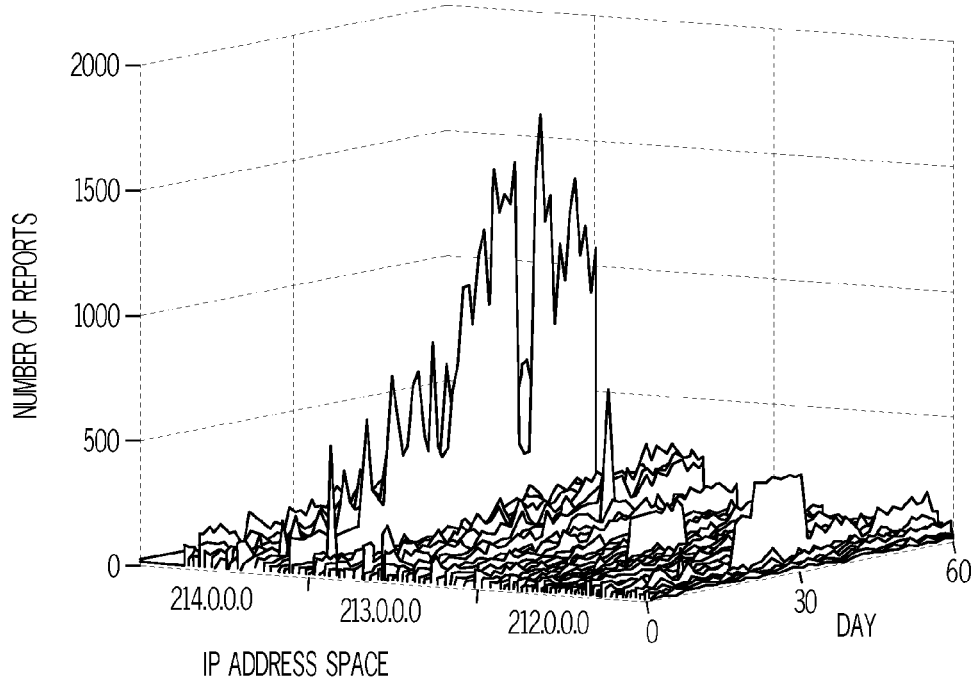
FIGS. 3a, 3b, and 3c show graphical depictions of malicious activity data according to an embodiment of the present invention.

FIG. 3a shows a visualization of reports of malicious activity generated by attacking systems over a portion of an Internet protocol (IP) address space plotted over time, based on data collected from firewall and intrusion system logs and then compiled by DShield.org (DShield). DShield is a web site that processes and compiles firewall and intrusion system logs from victim systems worldwide and also compiles blacklists of the most prolific attacking systems reported by the victim systems worldwide in the compiled firewall and intrusion system logs. As shown by FIG. 3a, attacking systems may behave differently from one another. For example, some attacking systems may attack consistently over time and by an order of magnitude higher than other attacking systems (heavy hitters), some attacking systems may attack with moderate-high intensity but only for a few days (spikes), some attacking systems may attack continuously in a certain time period but do not attack again, and other attacking systems may appear to be stealthy and generate limited activity.

Because attacking systems may often display a wide variety of dynamics, as shown in FIG. 3a, methods for predicting malicious activities of attacking systems that combine several complementary prediction techniques that capture different behavior may perform better than techniques that focus on only one type of attacking systems behavior.

Figure 3B:
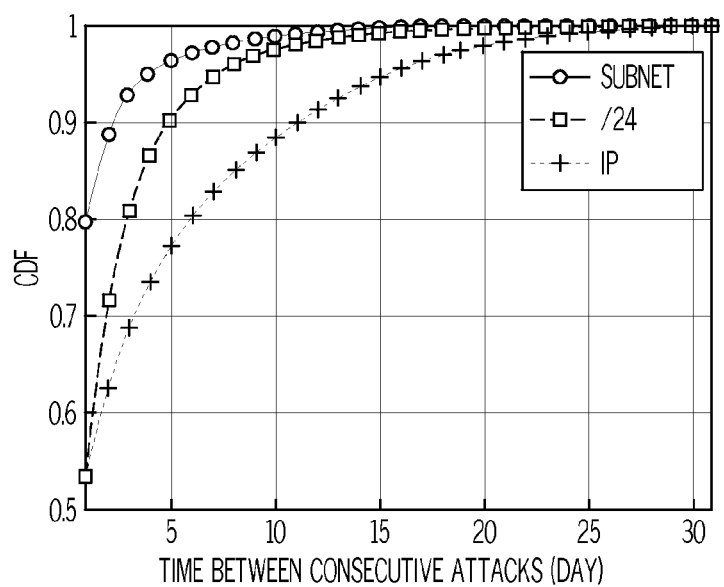

FIG. 3b shows a graphical illustration of a cumulative distribution function (CDF) of the time between attacks for the same attacking sources at three different levels of granularity: IP address, /24 prefix, and source subnet. As shown in FIG. 3b, for /24 prefixes, approximately 90% of attacks from the same attacking source happen within a time window of 5 days while the remaining 10% of attacks from the same attacking source are widely spread over an entire month. The attacking sources also show similar behavior at the IP address and source subnet levels.

From the graphical illustration shown in FIG. 3b, it appears that attacking sources may have a short memory: that is, if an attacking source attacks more than once, then there may be a high probability that the same attacking source will attack again soon. Therefore, the past history of attacks from an attacking system may be taken into account by a method for predicting malicious activities of attacking systems in order to improve its predictions.

Figure 3C:
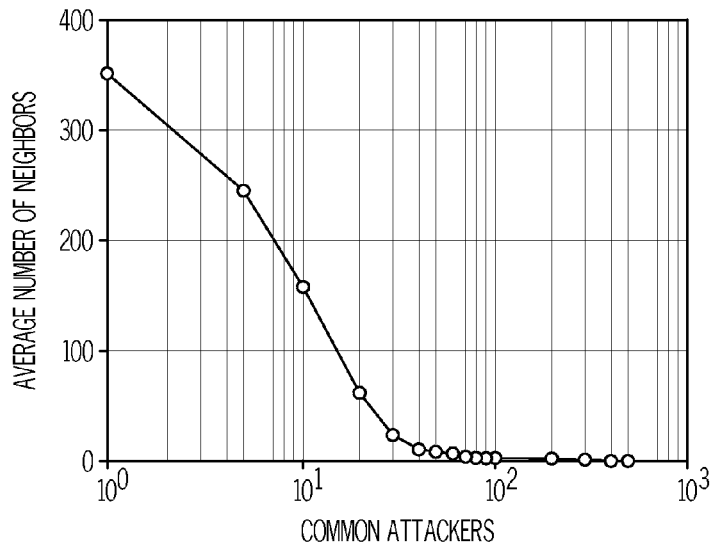

FIG. 3c shows a graph of an average number of neighbor networks as a function of the number of common attacking sources for a given day. Two victim systems may be considered neighbors if they share at least a certain number of common attacking sources. As shown in FIG. 3c, most victim systems may share only a few attackers because there may only be a few attacking sources (heavy hitters) that attack most victim networks. However, if the definition of neighbors is restricted to victim systems that share a large number of common attacking sources, although each victim system may have only a small number of neighboring victim systems, the small number of neighboring victim systems may be able to capture more meaningful types of interaction between attacking systems and victim systems.

From the graph in FIG. 3c, it appears that malicious behavior may be better predicted by considering victim systems with a small number (approximately 25) of neighboring victim systems. Therefore, victim systems with a small number of neighboring victim systems may also be taken into account by a method for predicting malicious activities of attacking systems in order to improve its predictions.

Figure 4:
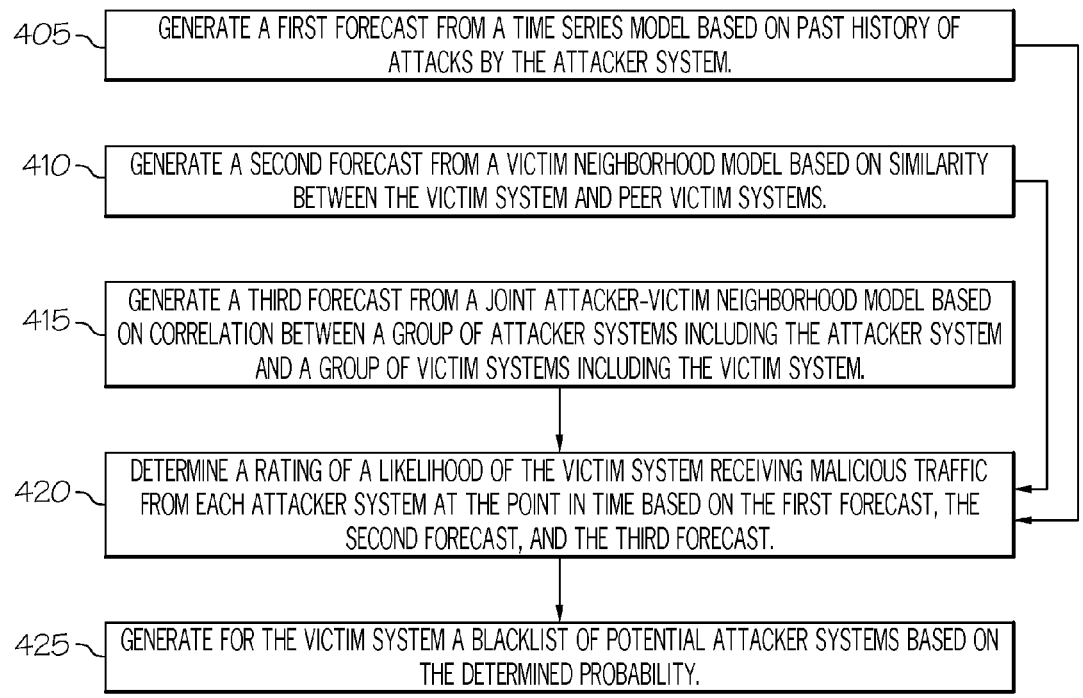
FIG. 4 shows a flowchart of a method for determining a rating of a likelihood of a victim system receiving malicious traffic from an attacker system at a point in time in accordance with an embodiment of the present invention.

FIG. 4 shows a flowchart of a method for determining a rating of a likelihood of a victim system receiving malicious traffic from an attacker system at a point in time in accordance with an embodiment of the present invention. As shown in FIG. 4, at step 405, a first forecast may be generated from a time series model based on past history of attacks by the attacker system. At step 410, a second forecast may be generated from a victim neighborhood model based on similarity between the victim system and peer victim systems. At step 415, a third forecast may be generated from a joint attacker-victim neighborhood model based on correlation between a group of attacker systems including the attacker system and a group of victim systems including the victim system. At step 420, the rating of the likelihood of the victim system receiving malicious traffic from each attacker system at the point in time may be determined based on the first forecast, the second forecast, and the third forecast. Note that the forecasts generated by each of the steps 405, 410, and 415 are inputs into step 420. At step 425, a blacklist of potential attacker systems may be generated for the victim system based on the determined rating. Although the method is described above in terms of a flowchart of steps, the steps may occur in any order and some of the steps may be performed simultaneously with any of the other steps. In an exemplary embodiment, the first forecast, the second forecast, and the third forecast may all be generated simultaneously.

Time Series Model

As discussed above, implicitly predicting future attacks by an attacker system of a victim system may differ from a recommendation system that predicts, for example, how much a user might enjoy watching a particular movie, because the attack intensity of an attacking system, as indicated by a rating or preference, may change over time. Therefore, both the attack intensity of an attacker system at the time an attack was reported and the attacks' evolution over time may need to be considered in order to more accurately forecast future attacks from the attacker system.

In accordance with an embodiment of the present invention, a time series approach may be used to model the temporal dynamics associated with every pair (a, v) of an attacker system a and a victim system v. As previously show in FIG. 3b, because each attack from the same attacker system may tend to occur within a small time interval from each other, an attacker system's future activity may strongly depends on its past history of activity. To that end, an Exponential Weighted Moving Average (EWMA) model may be employed to generate a first forecast.

The EWMA model may predict future values based on weighted past values, where the weighted past values have exponentially decreasing weights towards older values. Advantages of the EWMA model include that it may generally be more flexible in that it can model temporal trends. Because weights assigned to past observations may be exponentially scaled so that older observations carry less weight, frequently observed spikes in the number of reports in the analysis of malicious traffic activities may be accounted for. In context, the EWMA model may be used to predict an attack intensity, an attack intensity of an attacker system attacking a victim system at a point in time based on weighted past attack intensity ratings of the attacker system attacking the victim system at previous points in time, where the weighted past attack intensity ratings have exponentially decreasing weights towards older values.

More formally, given $r_{a,v}(t)$, which may be a rating of the attack intensity of attacker system a attacking victim system v at a point in time t, $\tilde{r}_{a,v}^{TS}(t+1)$ may represent the predicted value of $r_{a,v}(t+1)$, which may be a rating of the attack intensity of attacker system a attacking victim system v at a future point in time t+1. Using the EWMA model, $\tilde{r}_{a,v}^{TS}(t+1)$ may be estimated given past observations $r_{a,v}(t')$ at time $t' \leq t$ as follows:

$$\tilde{r}_{a,v}^{TS}(t+1) = \sum_{t'=1}^{t} \alpha(1-\alpha)^{t-t'} r_{a,v}(t'),$$

where $\alpha \in (0,1)$ may be the smoothing coefficient and $t'=1,K,t$ may indicate the training window, where 1 may correspond to the oldest day considered and t may correspond to the most recent day considered.

Because an attacker can stop its malicious activities at any time, and because the number of malicious traffic reported by a victim system might depend on the specific configuration of the victim system's network intrusion detection system, attacker systems that have performed a large number of attacks in the recent past may not be the most likely to attack again in the future. Rather, the attacker systems that may be more likely to keep on attacking may be attacker systems that were continuously reported as malicious for a large number of days independent of the number of reports generated by victim systems about attacks from those attacker systems.

Thus, in accordance with am embodiment of the present invention, an improved forecast of attack intensity from an attacker system a attacking victim system t at a future point in time t+1 may be obtained by applying the EWMA model upon a binary matrix B that may indicate whether or not an attack occurred during a particular day, $b_{a,v}(t)=1$ if and only if $r_{a,v}(t)>0$, otherwise $b_{a,v}(t)=0$, instead of based upon past intensity of attacks, as follows:

$$r_{a,v}^{TS}(t+1) = \sum_{t'=1}^{t} \alpha(1-\alpha)^{t-t'} b_{a,v}(t'),$$

where $r_{a,v}^{TS}(t+1)$ may indicate the forecast for an attack occurring $b_{a,v}(t+1)$ and may be interpreted as a measure of how likely an attacker is to attack again given its past history.

Neighborhood Model

While the time series model may be able to accurately model simple temporal dynamics, a neighborhood model may be able to generate a forecast that captures spatial correlation between different attacker systems and different victim systems such that it may be able to better forecast a persistent attacker that switches its target everyday. More specifically, two types of neighborhood models may be defined: a victim neighborhood model and a joint attacker-victim neighborhood model.

Victim Neighborhood Model

In accordance with an embodiment of the present invention, a victim neighborhood model may build on the idea that predictions may be made more accurately by trusting similar peers. For example, in a movie recommendation system, a neighborhood model based on similarity may predict that a user will like a particular movie only if other users that both have shown similar tastes to the user and have seen that particular movie also like that particular movie. Similarly, the victim neighborhood model may generate a forecast for a victim system based on the similarity between the victim system and peer victim systems.

One of the most commonly used measures of similarity may be the Pearson correlation, which may generalize the notion of cosine distance of vectors with non-zero means. Formally, given two n-dimensional vectors x and y, with mean values $m_x$ and $m_y$, respectively, the Pearson correlation may be defined as $$s_{xy} = \frac{\sum_{i=1}^{n}(x_i - m_x)(y_i - m_y)}{\sqrt{\sum_{i=1}^{n}(x_i - m_x)^2}\sqrt{\sum_{i=1}^{n}(y_i - m_y)^2}},$$

where for zero mean vectors this may reduce to $$s_{xy} = \frac{xy}{\|x\|_2\|y\|_2} = \cos(x, y).$$

Victim systems that persistently share common attacker systems may often be attacked at about the same time slot. Further, because victim systems that share attacks from the same attack system source in the same time slot may be more likely to be affected by the same type of attack, those victim systems may be more similar to each other than victim systems that share common attackers but during very different times.

Therefore, a variation of the Pearson correlation may be used to calculate a similarity $s_{uv}$, between a pair of victim systems u and v based on the time slot when a common attacker system a attacks the victim systems u and v as follows:

$$s_{uv} = \sum_{t_1 \leq t_2 \in T_{train}} e^{-|t_2-t_1|} \frac{\sum_{a \in A} b_{a,u}(t_1)b_{a,v}(t_2)}{\|b_u(t_1)\|_2\|b_v(t_1)\|_2},$$

where $\|b_u(t_1)\|_2 = \sqrt{\sum_{a \in A} b^2_{a,u}(t_i)}$. This variation of the Pearson correlation may result in giving higher importance to attacks that occur in the same time slot, rather than just using the number of common attackers between the victim systems in order to capture a stronger similarity amongst victim systems.

Note that if victim systems u and v report attacks at the same time slot, $s_{uv}$ may reduce to a sum of cosine similarities. Further, if victim systems u and v report attacks by the same attacker system at different time slots, the smoothing factor $e^{-|t_2-t_1|}$ may account for the time interval between the two attacks.

Once the similarity $s_{uv}$ of victims u and v is defined, a k-nearest neighbors (kNN) model may be defined to generate a forecast $r_{a,v}^{kNN}(t)$ of attack intensity at time t based upon $s_{uv}$ by modeling missing ratings as a weighted average of known ratings given to the same item by similar users:

$$r_{a,v}^{kNN}(t) = \frac{\sum_{u \in N^k(v;a)} s_{uv} r_{a,u}(t)}{\sum_{u \in N^k(v;a)} s_{uv}}, \forall t \in T_{test},$$

where $r_{a,v}^{kNN}(t)$ may be the forecast of attack intensity at time t provided by the kNN model, and where $N^k(v;a)$ may represent a neighborhood of top k similar victims to v according to the similarity measure s for which $r_{a,u}(t)$ is known.

In order to compute $r_{a,v}^{kNN}(t)$, both a similarity measure between victims s and a set of known ratings $r_{a,u}(t)$ for attacker a may be needed. However, none of the ratings $r_{a,u}(t)$ may be known in the testing window. Thus, the neighborhood $N^k(v;a)$ may be empty. In order to overcome this possibility, a generalization of the kNN model may be produced based on the forecast generated by the time series method:

$$r_{a,v}^{kNN}(t) = \frac{\sum_{u \in N^k(v;a)} s_{uv} r_{a,u}^{TS}(t)}{\sum_{u \in N^k(v;a)} s_{uv}}, \forall t \in T_{test}.$$

Joint Attacker-Victim Neighborhood Model

In accordance with an embodiment of the present invention, similarity amongst victim systems and similarity amongst attacker systems may both also be considered when constructing blacklists of attacker systems.

For example, while machines in a botnet may typically attack the same set of victims, the timing of the attacks may differ due to the machines being in different phases of the attacks: typically, a scanning phase may be carried out by a few machines before the attacking phase, which may be carried out by more machines, such as in a distributed denial-of-service attack. Thus, by knowing the similarity amongst the machines in a botnet, a victim may be able to preemptively put other similar machines in the botnet into a blacklist even if only a few of the machines in the botnet may have been detected by the victim's network intrusion detection system.

Therefore, in a joint attacker-victim model, similarity amongst both victims and attackers may be simultaneously found by applying a cross-associations (CA) algorithm, and the similarity may be used in order to forecast future attacks. The CA algorithm may be a fully automatic clustering algorithm that finds row and column group of sparse binary matrices, so that both groups of similar victims (contributors) and attackers (/24 subnets) may be found.

Figure 5:
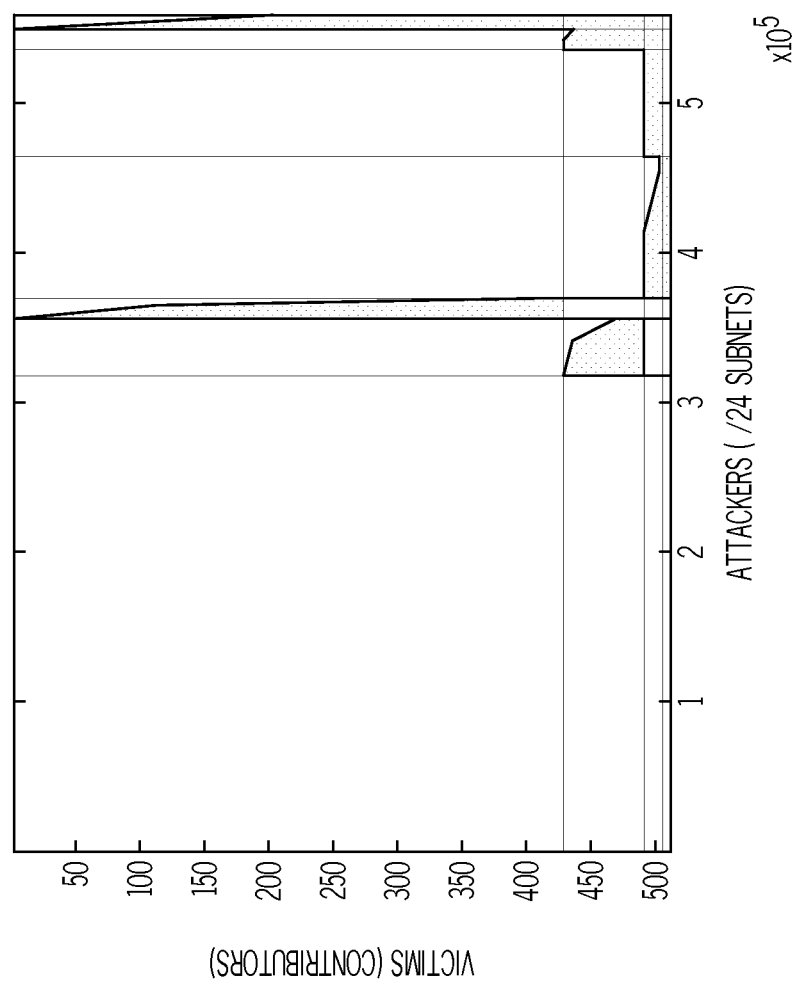
FIG. 5 shows a graphical depiction of a joint-attacker neighborhood model according to an embodiment of the present invention.

FIG. 5 shows a graphical view of the result of applying a cross-associations algorithm on a contributor-subnet matrix in accordance with an embodiment of the present invention. As shown in FIG. 5, each rectangular box may represent a group of similar victims and attackers. A density for each group of similar victims and attackers may be calculated as the ratio between the occupied (shaded) area of the rectangle over the total area of the rectangle in order to quantify the strength of correlation amongst the attackers and the victims in the group.

The density for each group may further be used for forecasting: the denser a group is, the more likely the attackers in the group may attack the victims in the group. More formally, this CA-based prediction may be written as: $\hat{r}_{a,v}^{CA}(t+1) = \rho_{a,v}(t)$, where $\rho_{a,v}(t) \in [0,1]$ may be the density of a group that contains attacker system a amongst the group of attacker systems and victim system v amongst the group of victim systems at time t.

To further improve the CA-based prediction model, the persistence of the attacker-victim correlation over time may also be captured. More particularly, because an attacker that persistently shows up in a neighborhood of a victim may be more likely to attack the victim again than other attackers, a EWMA-CA prediction model may apply the EWMA model on a time series of the density to predict a rating of a likelihood of future attacks by a attacker. An empirical study shows that the EWMA-CA prediction model may improve the hit count by 25% over the CA-based prediction model. The EWMA-CA prediction model may be more formally written as:

$$r_{a,v}^{CA}(t+1) = \sum_{t'=1}^{t} \alpha(1-\alpha)^{t-t'} \rho_{a,v}(t'),$$

where the forecast of an attack intensity of an attacker system a attacking a victim system v at a point in time t+1 may be based on weighted past density at previous points in time, where the weighted past density have exponentially decreasing weights towards older values.

Combined Predictors Model

In accordance with an embodiment of the present invention, multiple prediction models may be combined in order to better model the diverse dynamics of malicious traffic as previously shown in FIG. 3a. Thus, a single forecast of an attacker system a attacking victim system v at point in time t may be determined based on the time series model, the victim neighborhood model, and the joint attacker-victim neighborhood model.

In combining the aforementioned prediction models, the time series model may be used as a base predictor while weighing the victim neighborhood model and the joint attacker-victim neighborhood model in proportion to their respective accuracy.

Because the victim neighborhood model may be more accurate when a victim system v has a strong neighborhood of similar peer victims, its weight $\omega_{a,v}^{kNN}$ may be formally defined as $$\omega_{a,v}^{kNN} = \frac{\sum_{u \in N(v;a)} s_{uv}}{\sum_{u \in N(v;a)} s_{uv} + \lambda_1},$$

where $\lambda_1$ may be a parameter that is estimated. $\Sigma_{u \in N(v;a)} s_{uv}$ may be a measure of how similar a victim system v's neighborhood of peer victim systems is. When $\Sigma_{u \in N(v;a)} s_{uv}$ is small, it may indicate that victim system v's neighborhood may only be poorly similar. In that case, more weight may instead be placed instead on the joint attacker-victim neighborhood model. On the other hand, when $\Sigma_{u \in N(v;a)} s_{uv}$ is large, it may indicate that the victim system v's neighborhood is highly similar, and more weight may be placed on the victim neighborhood model.

The weight $\omega_{a,v}^{CA}$ for the joint attacker-victim neighborhood model may be based on the density of the group that the attacker-victim (a, v) pair belongs to and may be formally defined as $$\omega_{a,v}^{CA} = \frac{\sum_{t \in Ttrain} \rho_{a,v}(t)}{\sum_{t \in Ttrain} \rho_{a,v}(t) + \lambda_2},$$

so that $\omega_{a,v}^{CA} \cong 1$ for an (a, v) pair that belongs to dense clusters and that $\omega_{a,v}^{CA} \cong 0$ for when an (a, v) pair belongs to low-density clusters.

In combining the time series model, the victim neighborhood model, and the joint attack-victim neighborhood model, an embodiment of the present invention may be a single combined predictors model of a rating/prediction defined as follows: $\hat{b}_{a,v}(t) = r_{a,v}^{TS}(t) + \omega_{a,v}^{kNN} r_{a,v}^{kNN}(t) + \omega_{a,v}^{CA} r_{a,v}^{CA}(t)$, where $\hat{b}_{a,v}(t)$ may be the estimated value of $b_{a,v}(t)$ for $\forall t \in T_{test}$, which may be an indication of whether an attack by attacker system a will occur at victim system v at time t.

Performance Evaluation

In accordance with an embodiment of the present invention, the combined predictors model for forecasting may be evaluated based on a 1-month period of real logs of malicious activity provided by DShield, as described above.

Two metrics, the total hit count and the prediction rate, may be used in order to evaluate how well the combined predictors model forecasts malicious attacks. The total hit count metric may represent the number of attacker systems in a blacklist that are correctly predicted, and may be bound by the blacklist length. When the combined predictors model provides individual victims with their own customized blacklist, the total hit count metric may be defined as the sum of the hit counts over all contributors. The prediction rate metric may be a ratio between the total hit count and a global upper bound for each separate contributor. Thus, for each contributor, the prediction rate may be a number between 0 and 1, with a prediction rate of 1 indicating perfect prediction, that represents the fraction of attacker systems correctly predicted out of the global upper bound of the contributor, which may be the maximum number of attackers that may be predicted based upon past logs.

The time period over which the performance is evaluated may comprise a training window and a testing window. The training window may be the time period (in the recent past) over which logs may be analyzed in order to produce the blacklist. The subsequent testing window may then be the time period for which the predictions in the produced blacklist may be valid.

Figure 6A:
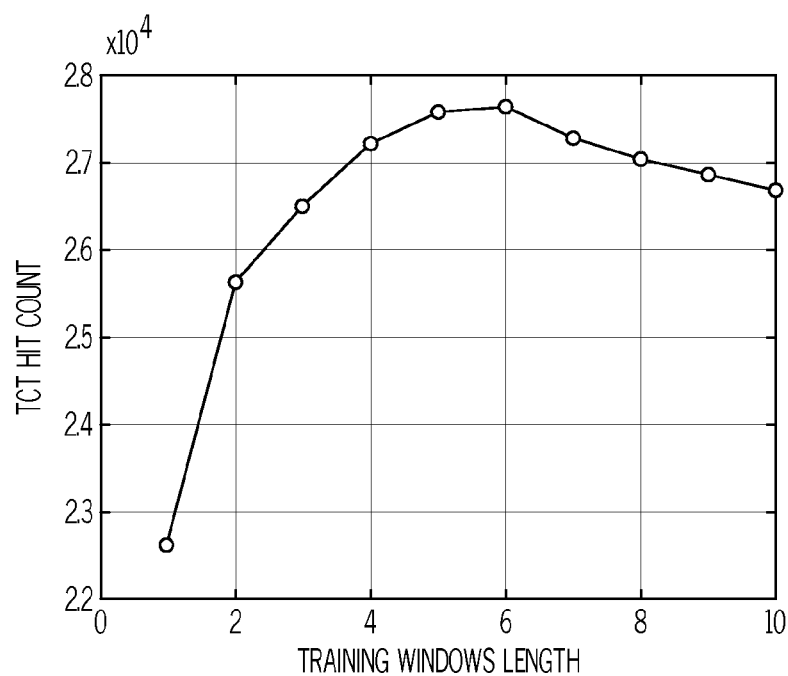
FIGS. 6a, 6b, and 6c show graphical depictions of total hit count over a training window length, total hit count over a test window length, and a prediction rate over a test window length, respectively, all in accordance with embodiments of the present invention.

FIG. 6a shows a graphical illustration of a total hit count over a training window length (in days). As shown in FIG. 6a, the total hit count may first increases with the days in a training window and then may decrease when the training window is more than 6 days long. FIG. 6a further shows that the training window should be set to between 5 and 6 days in order to achieve optimum performance.

Figure 6B:
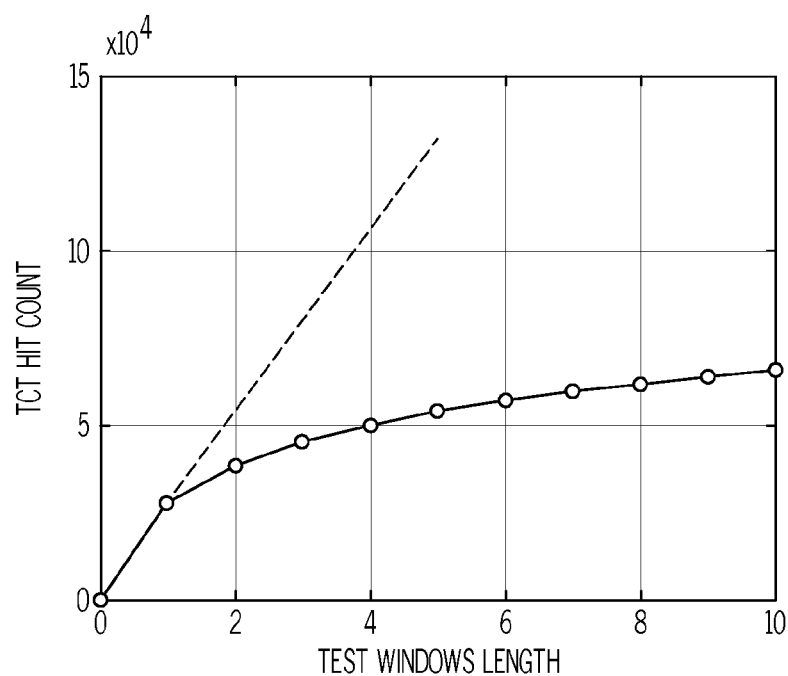

FIG. 6b shows a graphical illustration of a total hit count over a test window length (in days). As shown in FIG. 6b, the total hit count may be at least doubled by increasing the test window length from 1 day to 10 days. However, even with this improvement, the total hit count may be much less than the total hit count produced by evaluating the performance of the combined predictors model from scratch every day, as shown by the dotted line in FIG. 6b. Therefore, a short test window length may be preferable over a longer test window length.

Figure 6C:
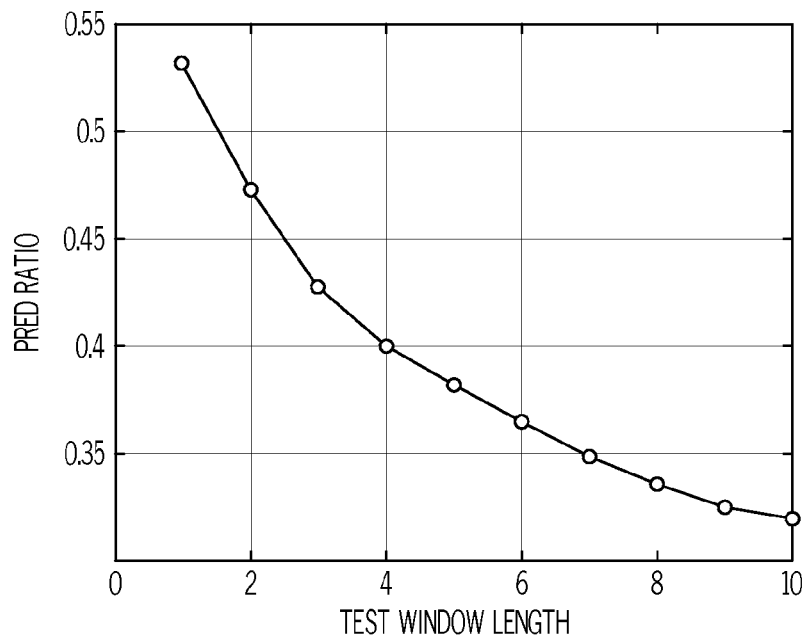

FIG. 6c shows a graphical illustration of a prediction rate over a test window length. As can be seen, the ratio of the total hit count over the upper bound for prediction may decrease with the length of the test window. Therefore, a short test window length may be preferable so that predictions may be trained and refreshed more regularly.

Therefore, in accordance with an embodiment of the present invention, the time period for a performance evaluation may comprise a 5-day training window and a 1-day testing window.

Besides the time period for the performance evaluation, other parameters, such as $\alpha$, $\lambda_1$ and $\lambda_2$, which may all be variables discussed above that may be needed in order to generate predictions from the combined predictors model, may be estimated using leave-one-out cross validation on the training set of data.

Lastly, in order to fairly compare the performance evaluation of the combined predictors model against prior evaluations of prior prediction methods, each predictive blacklist generated during the performance evaluation may specify /24

IP prefixes. However, the prediction models in accordance with embodiments of the present invention may apply to any considered granularity of IP addresses/prefixes.

Figure 7:
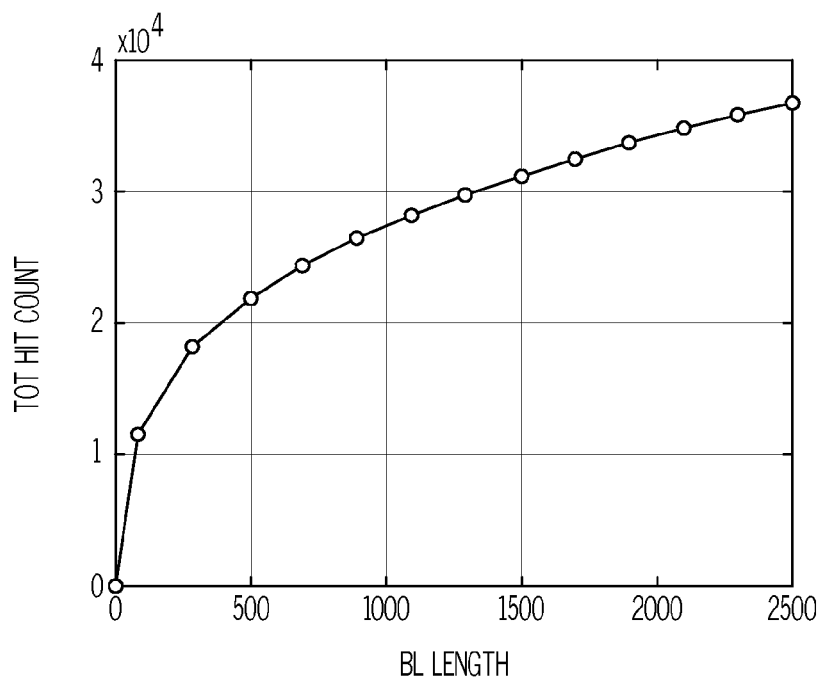
FIG. 7 shows a graphical illustration of the performance of the combined predictors method as a function of blacklist length in accordance with an embodiment of the present invention.

FIG. 7 shows a graphical illustration of the performance of the combined predictors method as a function of blacklist length in accordance with an embodiment of the present invention. As shown in FIG. 7, the hit count and the prediction rate may generally increase with the blacklist length. On average, a blacklist with a length of 500 may have a prediction rate of 50% while a blacklist with a length of 2500 may have a prediction rate of 59%. Thus, in accordance with an embodiment of the present invention, the optimal length for a predictive blacklist may be a black list with approximately 500 entries.

Generally, prediction schemes, such as the combined predictors model, may be separated into two categories based upon whether the models use local or global information.

Figure 8A:
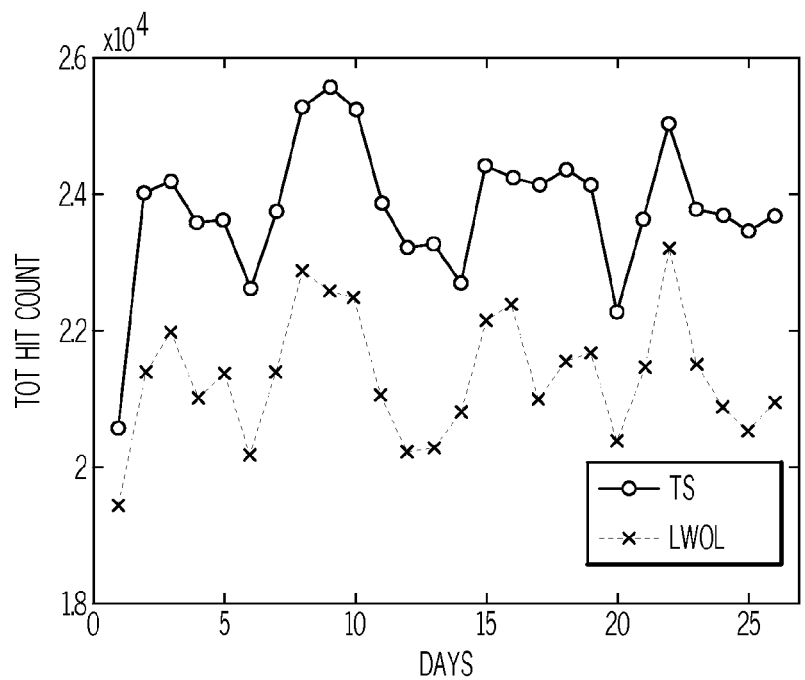
FIGS. 8a, 8b, and 8c shows graphical representations of the total hit count of local models over time, the total hit count of global models over time, and the total hit count of the proposed combined method versus the state-of-the-art and baseline over time, respectively, all in accordance with embodiments of the present invention.

The time series model and LWOL may be considered as being in a local category because they may use only local logs available at each network. FIG. 8a shows a graphical representation of the total hit count of models in the local category over time. Specifically, FIG. 8a shows the total hit count of the time series model and the total hit count of LWOL. As can be seen, while the performance of both models may oscillate based on differing data from day to day, the time series model consistently outperforms LWOL over time.

Figure 8B:
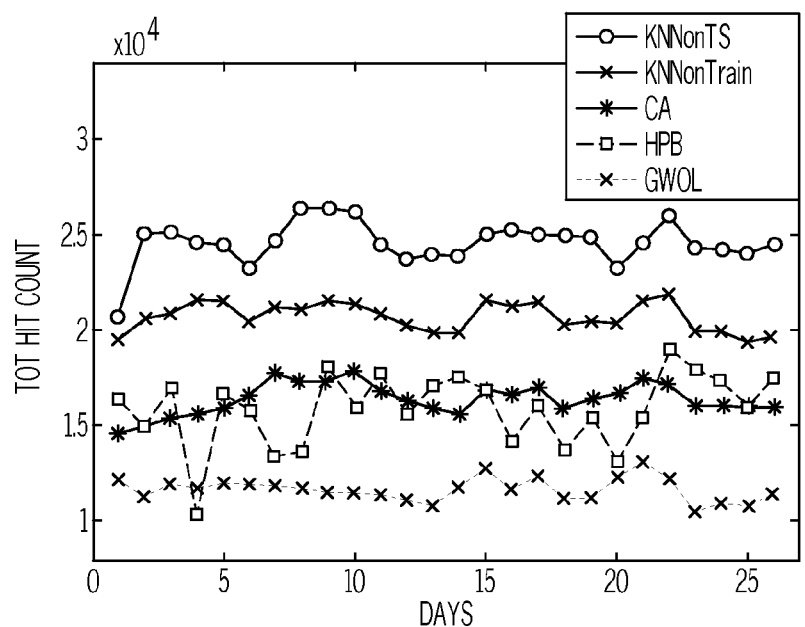

The neighborhood models, such as the victim neighborhood model and the joint attacker-victim neighborhood model, as well as GWOL may be considered to be in a global category since they may use logs collected and shared amongst multiple networks. FIG. 8b shows a graphical representation of the performance of global prediction schemes, namely comparing the hit count of GWOL, HBA with parameter 0.5, the victim neighborhood model, and the joint attacker-victim neighborhood model. As shown in FIG. 8b, HBA may outperform GWOL on average by around 36%. While the joint attacker-victim neighborhood model on average may have about the same performance as HBA, the performance of the joint attacker-victim neighborhood model may be more consistent over time while capturing different concepts of neighborhood. In addition, as also shown in FIG. 8b, the performance of the victim neighborhood model with 25 nearest neighbors with the model run on top of the last day's logs (KNNonTrain) and the performance of that model run on top of time series method predictions (KNNonTS) may both also be plotted. As can be seen, KNNonTrain may significantly outperform the joint attacker-victim neighborhood model while KNNonTS may further outperform KNNonTrain.

Figure 8C:
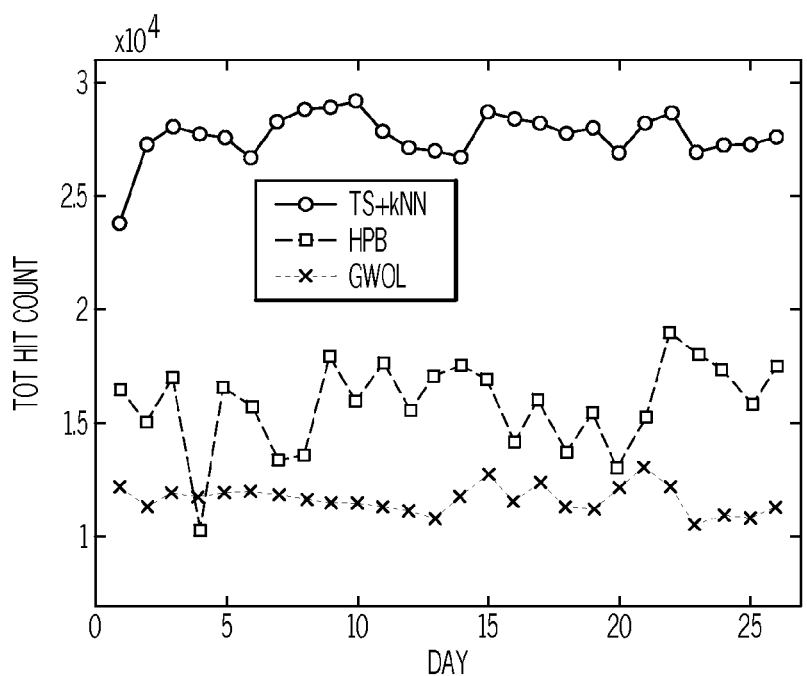

FIG. 8c shows a graphical representation of the performance of the combined predictors model discussed above against other prediction models such as HPB and GWOL. As shown in FIG. 8c, the combined predictors model may significantly outperform the state-of-the-art HPB prediction model (up to over 70% over the hit count of HPB with an average improvement of 57%) as well as GWOL.

The high performance of the combined predictors model may be due to the following reasons: first, looking at the set (and not only the number) of attackers predicted by each individual model within the combined predictors model, it appears that each individual model may provide to every contributor a customized blacklist that successfully predicts some of the attackers. Furthermore, besides predicting a common set of attackers, the three individual models may also successfully predict disjoint sets of attacks of significant size. For example, the time series model and the joint attacker-victim neighborhood model may successfully predict a common set of 9,900 attackers. However, the joint attacker-victim neighborhood model alone may capture an additional 6,100 attackers that the time series method alone may not be able to capture. Thus, the three predictor models may be combined so that they may complement each other, and also explains the hit count improvement when combining the three predictor models. Second, although adding new schemes in the combined predictors model may improve the total hit count, there may be diminishing returns as more prediction schemes are added. For example, while adding the joint attacker-victim neighborhood model to the time series model may result in a 12% average hit count improvement, adding the victim neighborhood model to those two models may yield only a 6% average hit count improvement. Thus, incorporating additional neighborhood schemes into the combined predictors model might only modestly improve the results.

In addition to improving the prediction of attackers, the combined predictors model may also increase robustness of systems against false alerts. False alerts may occur in logs contributed by networks due to pollution, which may be random false positives due to errors in the configuration of the network intrusion detection system of a contributor, or due to poisoning, which may be due to a malicious contributor trying to skew any resulting predictions.

Figure 9:
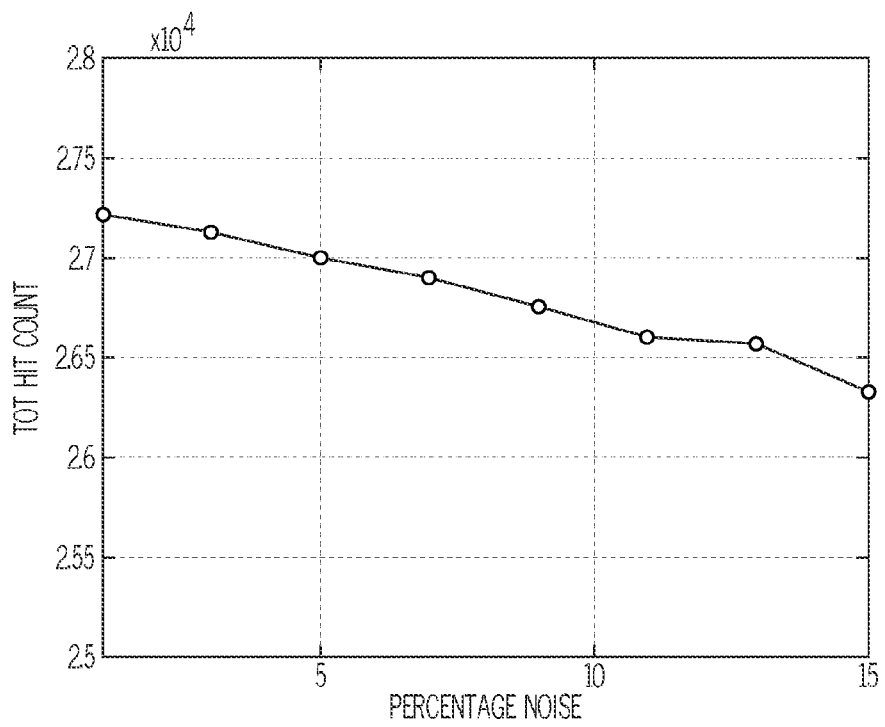
FIG. 9 shows a graphical representation of a total hit count of the combined predictors model as a function of blacklist length in accordance with an embodiment of the present invention.

FIG. 9 shows a graphical illustration of a total hit count for the combined predictors model as a function of the percentage of noise, also known as the pollution rate, introduced into the data analyzed by the combined predictors model in accordance with an embodiment of the present invention. As shown in FIG. 9, the hit count appears to decrease slower than the pollution rate, such that it may decrease by less than 4% when the pollution rate is at 15%.

Generally, because neighborhood models may usually correspond to different sources reported by different contributing networks, which does not introduce correlation between victims, they may be unlikely to be affected by false alerts generated at different networks. In order to introduce such correlation between victims, fake reports may need to be both from the same source and to have a similar timestamp in order to possibly affect the neighborhood models. Further, while a source that is falsely reported over several days by the same victim may affect the time series model, such an approach may not be effective in affecting a combined predictors model that includes neighborhood models along with the time series model.

The combined predictors model may also be more difficult for malicious contributors to poison because an attacker may need to evade detection by both the time series model and the two neighborhood-based models. While an attacker may limit traffic towards a target network in an attempt to mislead the time series model, the time series model may reveal even persistent low intensity activities. On the other hand, the neighborhood models may catch an attacker that tries to attack different networks for a short time. Thus, the multiple models approach of the combined predictors model may make it more difficult for malicious sources to skew its predictions.

Embodiments of the present invention may be conveniently implemented using a conventional general purpose or a specialized digital computer or microprocessor programmed according to the teachings of the present disclosure. Stored on any one of the computer readable storage medium (media), embodiments of the present invention may include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above. Included in the programming (software) of the general/specialized computers and microprocessors are software modules for implementing embodiments of the present invention.

Appropriate software coding can readily be prepared by skilled programmers based on the teachings of the present disclosure, as will be apparent to those skilled in the software art.

In some embodiments, the present invention may includes a computer program product which is a computer readable storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

It should be understood, of course, that the foregoing relates to exemplary embodiments of the invention and that modifications may be made without departing from the spirit and scope of the invention as set forth in the following claims.

We claim:

1. A method for determining a rating of a likelihood of a victim system receiving malicious traffic from an attacker system at a point in time, comprising:
generating a first forecast from a time series model based on past history of attacks by the attacker system,
generating a second forecast from a victim neighborhood model based on similarity between the victim system and peer victim systems;
the second forecast $r_{a,v}^{kNN}(t)$ of the attacker system a attacking the victim system v at the point in time t is generated based on a formula:

$$r_{a,v}^{kNN}(t) = \frac{\sum_{u \in N^k(v;a)} s_{uv} r_{a,u}^{TS}(t)}{\sum_{u \in N^k(v;a)} s_{uv}}, \forall t \in T_{test};$$

where S indicates a similarity measure such that $s_{uv}$, indicates a similarity measure of the victim system v to neighbor victim system u;
where $N^k(v;a)$ indicates a neighborhood of top k similar victims to victim system v according to the similarity measure;
where $r_{a,v}^{kNN}r(t)$ indicates the first forecast; and
where T indicates a time period such that $T_{test}$ indicates a test window, and
wherein k is a number of similar victims, and kNN is a k nearest neighbor victim;
generating a third forecast from a joint attacker-victim neighborhood model based on correlation between a group of attacker systems including the attacker system and a group of victim systems including the victim system,
wherein the correlation between the group of attacker systems and the group of victim systems is based on a three dimensional prediction matrix of the group of attacker systems and the group of victim systems in which intensity of the attacks vary with time; and
determining the rating of the likelihood of the victim system receiving malicious traffic from the attacker system at the point in time based on the first forecast, the second forecast, and the third forecast, wherein at least one of: the generating of the first forecast, the generating of the second forecast, the generating of the third forecast or determining the rating is executed by a computer processor.

2. The method of claim 1 further comprising:
generating for the victim system a blacklist of potential attacker systems based on the determined rating.

3. The method of claim 1 wherein the time series model is based on an Exponential Weighted Moving Average model.

4. The method of claim 3 wherein the Exponential Weighted Moving Average model determines a rating of a likelihood of future attacks by the attacking system on the victim system based on past likelihoods of attacks of the victim system by the attacking system that are weighed with exponentially decreasing weights towards older values.

5. The method of claim 1 wherein the past history of attacks the attacker system includes any level of aggregation of an attacker system internet protocol address of a past attack, any level of aggregation of a victim system internet protocol address of a past attack, and a time of a past attack.

6. The method of claim 1, wherein the second forecast from the victim neighborhood model is generated based on the first forecast generated from the time series model.

7. The method of claim 1, wherein:
the similarity between the victim system and peer victim systems is based on past history of attacks by the attacking system towards the victim system and the peer victim systems, including a closeness in time of the past history of attacks by the attacking system towards the victim system and the peer victim system.

8. The method of claim 1 wherein:
the third forecast $r_{a,v}^{CA}(t+1)$ of the attacker system a attacking the victim system v at the point in time t+1 is generated based on a formula:

$$r_{a,v}^{CA}(t+1) = \sum_{t'=1}^{t} \alpha(1-\alpha)^{t-t'} \rho_{a,v}(t');$$

where $\alpha \in (0,1)$ is a smoothing coefficient;
where CA are cross-associations;
where t is a point in time such that t'=1,K , t indicates a training window; and
where $\rho_{a,v}(t')$ indicates a density measure of the group of attacking systems including the attacking system and the group of victim systems including the system at time t'.

9. The method of claim 1 wherein:
generating a probability $b_{a,v}(t)$ of the victim system v receiving malicious traffic from the attacker system a at the point in time t based on the first forecast $r_{a,v}^{TS}(t)$, the second forecast $r_{a,v}^{kNN}(t)$, and the third forecast $r_{a,v}^{CA}(t)$ based on a formula: $\hat{b}_{a,v}(t) = r_{a,v}^{TS}(t) + \omega_{a,v}^{kNN} r_{a,v}^{kNN}(t) + \omega_{a,v}^{CA} r_{a,v}^{CA}(t)$;
wherein T indicates a time period, S indicates a similarity measure, kNN is a k nearest neighbor victim, and CA are cross associations,
where $\omega_{a,v}^{kNN}$ is a kNN weight for weighing the second forecast; and where $\omega_{a,v}^{CA}$ is a CA weight for weighing the third forecast.

10. A system comprising:
a hardware processor; and
a computer program that executes on the hardware processor to perform:
generating a first forecast from a victim neighborhood model based on similarity between a victim system and peer victim systems;
associating a first weight with the first forecast that correlates with the similarity between the victim system and peer victim systems;
generating a second forecast from a joint attacker-victim neighborhood model based on correlation between a group of attacker systems including the attacker system and a group of victim systems including the victim system;
the second forecast $r_{a,v}^{kNN}(t)$ of the attacker system a attacking the victim system v at the point in time t is generated based on a formula:

$$r_{a,v}^{kNN}(t) = \frac{\sum_{u \in N^k(v;a)} s_{uv} r_{a,u}^{TS}(t)}{\sum_{u \in N^k(v;a)} s_{uv}}, \forall t \in T_{test};$$

where S indicates a similarity measure such that $s_{uv}$, indicates a similarity measure of the victim system v to neighbor victim system u;
where $N^k(v;a)$ indicates a neighborhood of top k similar victims to victim system v according to the similarity measure;
where $r_{a,v}^{kNN}r(t)$ indicates the first forecast; and
where T indicates a time period such that $T_{test}$ indicates a test window, and
wherein k is a number of similar victims, and kNN is a k nearest neighbor victim;
associate a second weight with the second forecast that correlates with a density of the group of attacker systems including the attacker system and the group of victim systems including the victim system;
accepting user input that estimates a user's level of liking a victim system; and
determining a rating of a likelihood of the victim system receiving malicious traffic from the attacker system at a point in time based on the first forecast weighed with the first weight and the second forecast weighed with the second weight, and on the estimated user's level of liking the victim system.

11. The system of claim 10, wherein the similarity between the victim system and peer victim systems is based on past history of attacks by the attacking system towards the victim system and the peer victim systems including a closeness in time of the past history of attacks by the attacking system towards the victim system and the peer victim system.

12. The system of claim 10, wherein the correlation between the group of attacker systems including the attacker system and the group of victim systems including the victim system is based on the density of the group of attacker systems including the attacker system and the group of victim systems including the victim system at a previous point in time.

13. The system of claim 12, wherein the joint attacker-victim neighborhood model applies an Exponential Weighted Moving Average model on a time series of the density.

14. The system of claim 13, wherein the Exponential Weighted Moving Average model determines a rating of a likelihood of attacks from the attacker system based on past density values of the group of attacker systems including the attacker system and the group of victim systems including the victim system weighed with exponentially decreasing weights towards older density values.

15. A non-transitory computer readable storage medium having instructions stored thereon that when executed by a processor cause a system to:
generate a first forecast from an Exponential Weighted Moving Average model that determines a likelihood of future attacks by an attacking system on a victim system based on past likelihoods of attacks of the victim system by the attacking system that are weighed with exponentially decreasing weights towards older values;
generate a second forecast from a neighborhood model based on a correlation between the victim system, attacker systems, and victim systems, wherein the correlation includes comparing an average number of the victim systems as a function of a number of common attacking systems; and
the second forecast $r_{a,v}^{kNN}(t)$ of the attacker system a attacking the victim system v at the point in time t is generated based on a formula:

$$r_{a,v}^{kNN}(t) = \frac{\sum_{u \in N^k(v;a)} s_{uv} r_{a,u}^{TS}(t)}{\sum_{u \in N^k(v;a)} s_{uv}}, \forall t \in T_{test};$$

where S indicates a similarity measure such that $s_{uv}$, indicates a similarity measure of the victim system v to neighbor victim system u;
where $N^k(v;a)$ indicates a neighborhood of top k similar victims to victim system v according to the similarity measure;
where $r_{a,v}^{kNN}r(t)$ indicates the first forecast; and
where T indicates a time period such that $T_{test}$ indicates a test window, and
wherein k is a number of similar victims, and kNN is a k nearest neighbor victim;
determine a rating of a likelihood of the victim system receiving malicious traffic from the attacker system at a point in time based on the first forecast and the second forecast.

16. The computer readable storage medium of claim 15 wherein:
the point in time is a testing window; and
the rating of the likelihood is determined based on a training window previous in time to the testing window.

17. The computer readable storage medium of claim 15, wherein:
the neighborhood model further comprises a victim neighborhood model and a joint attacker-victim neighborhood model.

18. The computer readable storage medium of claim 17, wherein:
the joint attacker-victim neighborhood model generates a forecast based on a density of a group of attacker systems including the attacker system and a group of victim systems including the victim system at a previous point in time.

19. The computer readable storage medium of claim 15, wherein:
   the past likelihoods of attacks of the victim system by the attacking system indicates for each time slot in a period of time previous to the point n time whether the victim system was attacked by the attacking system.

* * * * *

UNITED STATES PATENT AND TRADEMARK OFFICE
CERTIFICATE OF CORRECTION

PATENT NO. : 8,572,746 B2 Page 1 of 1
APPLICATION NO. : 12/691631
DATED : October 29, 2013
INVENTOR(S) : Markopoulou et al.

It is certified that error appears in the above-identified patent and that said Letters Patent is hereby corrected as shown below:

In the Specification

In Column 5, Line 52, delete "a ttack" and insert -- attack --, therefor.

In Column 8, Line 22, delete "am" and insert -- an --, therefor.

In Column 10, Line 63, delete "a attacker." and insert -- an attacker. --, therefor.

In the Claims

In Column 15, Line 49, in Claim 1, delete "$s_{uv}$," and insert -- $s_{uv}$ --, therefor.

In Column 17, Line 29, in Claim 10, delete "$s_{uv}$," and insert -- $s_{uv}$ --, therefor.

In Column 18, Line 35, in Claim 15, delete "$s_{uv}$," and insert -- $s_{uv}$ --, therefor.

In Column 19, Line 5, in Claim 19, delete "n" and insert -- in --, therefor.

Signed and Sealed this
Sixth Day of May, 2014

Michelle K. Lee
*Deputy Director of the United States Patent and Trademark Office*